United States Patent [19]

Kucharska et al.

[11] Patent Number: 4,623,479

[45] Date of Patent: Nov. 18, 1986

[54] BLOWING AGENTS AND THEIR USE IN PREPARATIONS OF POLYESTER FOAMS

[75] Inventors: Helena Z. Kucharska; Thomas M. Burton, both of Sarnia, Canada

[73] Assignee: Fiberglas Canada Inc., Toronto, Canada

[21] Appl. No.: 642,323

[22] Filed: Aug. 20, 1984

Related U.S. Application Data

[62] Division of Ser. No. 607,047, May 4, 1984, Pat. No. 4,507,406.

[30] Foreign Application Priority Data

Dec. 12, 1983 [CA] Canada .................................. 443118

[51] Int. Cl.$^4$ ............................................. C09K 3/00
[52] U.S. Cl. .................................... 252/350; 423/284; 423/286; 521/85; 521/105; 564/8
[58] Field of Search ..................... 423/284, 286; 564/8; 252/350

[56] References Cited

U.S. PATENT DOCUMENTS

| | | | |
|---|---|---|---|
| 3,108,139 | 10/1963 | Larchar | 564/8 |
| 3,475,138 | 10/1969 | Carvalho | 423/284 |
| 3,620,807 | 11/1971 | Murray | 564/8 |
| 3,667,923 | 6/1972 | Wade | 423/284 |
| 4,216,168 | 8/1980 | Evans et al. | 564/8 |

OTHER PUBLICATIONS

"Boron, Metallo-Boron Compounds and Boranes", Roy M. Adams Interscience Publishers, Chapter 6.
"Progress in Organic Chemistry", B. D. James et al, vol. 11, Interscience Publishers (1970), pp. 99–175.
Comprehensive Inorganic Chemistry", J. C. Bailar, Jr. et al, Pergamon Press, copyright 1973, pp. 752 and 753.

*Primary Examiner*—Morton Foelak
*Attorney, Agent, or Firm*—Sughrue, Mion, Zinn, Macpeak, and Seas

[57] ABSTRACT

Quaternary ammonium borohydrides of the formula

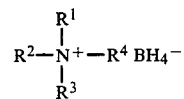

wherein $R^1$, $R^2$ and $R^3$ may be same or different and each is selected from alkyl, alkenyl, cycloalkyl, aryl, alkaryl and aralkyl groups and $R^4$ is selected from alkyl and alkenyl groups having from 1 to 30 carbon atoms, with the proviso that $R^1$, $R^2$, $R^3$ and $R^4$ are not all alkyl or that $R^1$, $R^2$ or $R^3$ is not benzyl when the remainder of $R^1$, $R^2$, $R^3$ and $R^4$ are all methyl or ethyl. The new borohydrides are prepared by either mixing a borohydride salt and a quaternary ammonium salt in alkaline aqueous solution and extracting the resulting quaternary amine borohydride with an organic solvent or by reacting finely divided borohydride salt with an organic solution of quaternary ammonium salt. The new compounds are used for foaming polyester resins.

8 Claims, No Drawings

BLOWING AGENTS AND THEIR USE IN PREPARATIONS OF POLYESTER FOAMS

This is a division of application Ser. No. 607,047, filed May 4, 1984, U.S. Pat. No. 4,507,406, Mar. 26, 1985.

BACKGROUND OF THE INVENTION

(1) Field of the Invention

This invention relates to quaternary ammonium borohydrides, their preparation and use in the preparation of polyester foams.

(2) Discussion of Prior Art

Some quaternary ammonium borohydrides are known and are used as reducing agents in organic reactions. In particular tetra-alkyl ammonium borohydrides are disclosed generally by B. D. James et al in "Progress In Inorganic Chemistry", Vol. 11, Interscience Publishers, 1970, pages 170–171. There is also discussed in the same publication N,N'-dimethyl and N-methyl-N-ethyl piperidinium borohydride. Certain tetra-alkyl ammonium borohydrides are also disclosed in "Boron, Metallo-Boron Compounds and Borones", by Roy M. Adams, Interscience Publishers, pages 457–60.

SUMMARY OF THE INVENTION

It has now been discovered that quaternary ammonium borohydrides are useful in foaming compositions for foaming unsaturated polyester compositions. This is due to the characteristics that these compounds are extremely reactive with hydroxyl groups to release hydrogen in quantities suitable for foaming.

During research concerning foaming of polyester compositions, attempts were made to find liquid foaming compositions whih might be used in conventional spray-mix apparatus in conjunction with polyester compositions. This research led to the discovery of new quaternary ammonium borohydrides useful in foaming compositions.

Accordingly, in one aspect the invention provides a quaternary ammonium borohydride which is liquid or a low melting solid easily liquified at ambient temperatures with small amounts of solvents or addition of impurity and is of the formula:

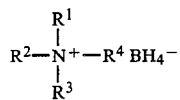

where $R^1$, $R^2$ and $R^3$ may be the same or different and each is selected from alkyl, alkenyl, cycloalkyl, aryl, alkaryl and aralkyl groups and $R^4$ is selected from alkyl or alkenyl groups having from 1 to 30 carbon atoms with the proviso that $R^1$, $R^2$, $R^3$ and $R^4$ are not all alkyl or that $R^1$, $R^2$ or $R^3$ is not benzyl when the remainder of $R^1$, $R^3$, $R^3$ and $R^4$ are all methyl or ethyl.

Suitable low melting solid borohydrides are those which have a melting point of less than 60° C., preferably less than 30° C. In use, the melting point of such solid borohydrides can be depressed by the addition of impurity or by employing a mixture of borohydrides.

Another aspect of the invention provides a quaternary ammonium borohydride of the formula:

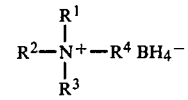

in which $R^1$ and $R^2$ are methyl groups, $R^3$ is a benzyl group and $R^4$ is an alkyl or alkenyl group having 6 to 20 carbon atoms.

One method of preparing the novel compounds of the invention comprises mixing alkaline aqueous solutions of a borohydride salt and a quaternary ammonium salt corresponding to the desired quaternary ammonium borohydride, extracting the resulting quaternary ammonium borohydride with an organic solvent, and evaporating the solvent.

Another method of preparing the novel compounds according to the invention comprises adding, as reactants, a finely divided solid borohydride salt to an organic solution of a quaternary ammonium salt corresponding to the desired quaternary ammonium borohydride, and permitting the reactants to react to form quaternary ammonium borohydride in solution and precipitate by-product.

However, it is believed that these methods are novel of themselves and can also be employed for preparing known quaternary ammonium borohydrides. Accordingly, a further aspect of the invention provides a method of preparation of a compound which is a liquid or low melting solid at ambient temperatures and has the formula:

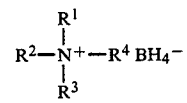

in which $R^1$, $R^2$ and $R^3$ *may be the same or different and each is selected from alkyl, alkenyl, cycloalkyl, aryl, alkaryl and aralkyl groups and $R^4$* is selected from alkyl or alkenyl groups having from 1 to 30 carbon atoms, which method comprises:

mixing alkaline aqueous solutions of a borohydride salt, and a quaternary ammonium salt corresponding to the desired quaternary amine borohydride, extracting the resulting quaternary amine borohydride with an organic solvent, and evaporating the solvent; or adding, as reactants, a finely divided solid borohydride salt to an organic solution of a quaternary ammonium salt corresponding to the desired quaternary amine borohydride, and permitting the reactants to react to form quaternary amine borohydride in solution and precipitate by-product.

DETAILED DESCRIPTION OF THE INVENTION

Polyester resin compositions which may be foamed using quaternary ammonium borohydrides are the thermosetting polyesterification or condensation products of polyhydric alcohols with polycarboxylic acids at least one of which is ethylenically unsaturated. In practice, these polyester resins are used in admixture with the copolymerizable ethylenically unsaturated monomers. Preferred resins are of medium to high reactivity, i.e. those where molar ratio of ethylenically unsaturated polycarboxylic acid to other polycarboxylic acid is equal or greater than one.

In order to simultaneously foam and crosslink the polyester composition by the process of this invention, the polyester component is catalyzed with peroxide, hydroperoxide or perester. The catalysts useful in this invention are the peroxides which are used conventionally as curing agents for unsaturated polyester compositions. The particularly suitable ones are those which give acceptable pot life i.e. at least 8 hours when incorporated into the resin composition, i.e. benzoyl peroxide especially with admixture of cumyl hydroperoxide, tert. butyl hydroperoxide or tert. butyl perbenzoate.

The catalyzed resin composition can also contain hydroxyl bearing compounds such as organic acids, alcohols, glycols and polyglycols or their mixtures to act as activators for promoting the decomposition of the borohydride. Also addition of suitable surfactant is helpful in establishing a fine, uniform cell structure. This can be of anionic, cationic or nonionic nature. The preferred surfactant is of a silicone type. Fillers, additives such as fire retardants, dyes, thixotropic agents, waxes, etc. and reinforcement to modify properties and cost can also be incorporated into the resin composition. In order to promote a better cure of the foamed product obtained by the process of the invention, a promoter can be included in the system. The promoter may be a tertiary amine which is stable with the borohydride. Preferred amines are dimethyl aniline and diethyl aniline and their mixtures. Due to the chemistry of the unsaturated polyester resin and the foaming system, this amine promoter has to be incorporated in the foaming component.

The unsaturated polyester resin composition, and the liquid foaming agent are eminently suitable for use with conventional spray up equipment (supplied by Venus, Binks, Glasscraft, etc.). The foaming, gelling and crosslinking proceed on emergence of the mix from the head of the spraying equipment. Application of heat is unnecessary, the crosslinking reaction is exothermic. Using spray up equipment, the two components can advantageously be mixed in a ratio of polyester resin to foaming agent of 100 to 0.5 to 100:12 by volume in the spray up equipment.

DESCRIPTION OF THE PREFERRED EMBODIMENTS

The following preparative Examples are given for the purpose of illustrating the invention.

PREPARATIVE EXAMPLES

Quaternary ammonium borohydrides were prepared from the following quaternary ammonium salts:

| | |
|---|---|
| MAQUAT MC 1412 | n-alkyl (50% $C_{14}$, 40% $C_{12}$, 10% $C_{16}$) |
| HYAMINE 3500 | dimethyl benzyl ammonium chloride |
| ALKAQUAT 451 | |
| MAQUAT MC 1416 | n-alkyl (60% $C_{14}$, 30% $C_{16}$, 5% $C_{12}$, 5% $C_{18}$) dimethyl benzyl ammonium chloride |
| ARQUAD 16-50 | trimethyl hexadecyl ammonium chloride |

The methods employed were as follows:
(a) From aqueous solutions of the starting quaternary ammonium salt Sodium borohydride (1.05 mole) as 15% by weight solution in water at pH 12 was added to a solution of the quaternary ammonium chloride (1 mole) in water at pH 12. After agitation for two minutes, the mixture was extracted with methylene chloride, the organic layer separated and solvent removed (reduced pressure evaporation) to give the quaternary ammonium borohydride.

(b) From non-aqueous solutions of the starting quaternary ammonium salt

Powdered sodium borohydride (1.1 mole) was added to a solution in isopropanol of the quaternary ammonium salt (1 mole) and optionally aromatic amines (e.g. dimethyl aniline and diethyl aniline at 15% by weight in total) and the mixture was stirred for 1 hour. After filtration to remove the precipitated sodium salt, a solution of the quaternary ammonium borohydride was obtained. This solution may be used as a foaming composition in the preparation of foamed polyester resins.

In each case, the borohydride was obtained as a clear liquid. The identity of the product obtained was verified by infrared spectrum, nitrogen content and hydrogen content, with the results conforming generally with those expected from theoretical considerations.

Thus, for dimethyl benzyl ammonium borohydride (obtained from Alkaquat 451), quantitative elemental analysis of the product obtained indicated 4.1% nitrogen which agrees well with the calculated value of 4.14%.

The hydrogen content of the borohydrides was ascertained by determination of the volume of hydrogen evolved when the salt was treated with dilute acid, since theoretically 4 moles of hydrogen are produced per mole of borohydride. For the dimethyl benzyl ammonium borohydride obtained as described above, it was calculated that 1 gram should produce 265 ml of hydrogen at standard temperature and pressure. Experimentally it was found that 1 gram of the Alkaquat based borohydride reaction product produced 259 ml of hydrogen, (not normalized to STP), thus indicating that substantially complete formation of the borohydride had been achieved in the reaction of the chloride with $NaBH_4$.

Moreover, the infrared spectrum for the Alkaquat based borohydride showed clearly the B-H stretch and bend bands at 2200–2400 $cm^{-1}$ and 1120 $cm^{-1}$ for the sodium borohydride molecule and at 2130–2280 $cm^{-1}$ and 1080 $cm^{-1}$ for the quaternary ammonium salt.

USE EXAMPLES 1–11

These Examples illustrate use of the quaternary ammonium borohydrides in preparation of low density foams with filled and unfilled resin formulations. In these Examples, the following materials were used:

Resin 1: Unsaturated polyester resin based on propylene glycol, isophthalic acid and maleic anhydride of 3:1 maleic:isophthalic molar ratio.

Resin 2: Unsaturated polyester resin based on propylene and diethylene glycols, isophthalic acid and maleic anhydride of 1:1 acid:anhydride ratio.

Resin 3: Unsaturated polyester resin based on propylene and diethylene glycols, adipic, phthalic and maleic anhydride of 3.3:1 acids to maleic anhydride molar ratio.

Resin 4: Unsaturated polyester resin based on propylene and diethylene glycols, phthalic and maleic anhydride of 2:1 phthalic to maleic anhydride ratio.

Resin 5: Unsaturated polyester resin based on propylene glycol, phthalic and maleic anhydrides with 1:1 phthalic to maleic ratio.

Surfactant: (preferred) DC193, Dow Corning—a silicone glycol copolymer.

Thixotropic agent: Aerosil 200, Degussa—fumed silicon dioxide.

The components A and B were prepared according to the formations detailed in the Table. Mixing and spraying was carried out using standard processing equipment, i.e. Venus H.I.S. System.

The components were mixed in spray equipment in a ratio of A to B of from 100:3 to 100:11 by volume to give foams which gelled within 10-20 sec. and cured within 5 minutes. The densities obtained for individual foams are shown in the Table.

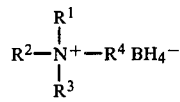

in which $R^1$ and $R^2$ are methyl groups, $R^3$ is a benzyl group and $R^4$ is an alkyl or alkenyl group having 6 to 20 carbon atoms, the borohydrides of said mixture varying only with respect to differences in group $R^4$.

3. A mixture comprising n-alkyl (50% $C_{14}$, 40% $C_{12}$, 10% $C_{16}$) dimethyl benzyl ammonium borohydrides.

4. A mixture comprising n-alkyl (60% $C_{14}$, 30% $C_{16}$, 5% $C_{12}$, 5% $C_{18}$) dimethyl benzyl ammonium borohydrides.

5. A method of preparing a mixture of quaternary ammonium borohydrides which is liquid or readily liquifiable at ambient temperatures, said mixture comprising at least two different borohydrides which fall within the formula:

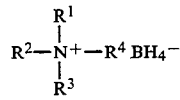

wherein $R^1$, $R^2$ and $R^3$ may be the same or different and each is selected from alkyl, alkenyl, cycloalkyl, aryl, alkaryl and aralkyl groups and $R^4$ is selected from alkyl or alkenyl groups having from 6 to 30 carbon atoms, with the proviso that $R^1$, $R^2$, $R^3$ and $R^4$ are not all alkyl or that $R^1$, $R^2$, or $R^3$ is not benzyl when the remainder of $R^1$, $R^2$, $R^3$ and $R^4$ are all alkyl and with the proviso that the borohydrides of said mixture vary only with respect to differences in group $R^4$, which method com-

TABLE

| Composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Component A | | | | | | | | | | | |
| Resin 1 | 78.5 | 80 | 80 | 60 | 80 | 80 | — | — | — | — | — |
| Resin 2 | 21.5 | 20 | 20 | — | 20 | 20 | — | 100 | 100 | — | — |
| Resin 3 | — | — | — | 40 | — | — | — | — | — | — | — |
| Resin 4 | — | — | — | — | — | — | — | — | — | — | 100 |
| Resin 5 | — | — | — | — | — | — | 100 | — | — | 100 | — |
| Aerosil 200 | 1.5 | 1.5 | 2 | 0.75 | 1 | 1 | 0.2 | 0.2 | 0.2 | 1.5 | 1.0 |
| Surfactant DC193 | 4 | 4 | 4 | 2 | 3 | 3 | 3 | 3 | 3 | 2 | 2 |
| Ethanol | 10 | 10 | 10 | 4 | 4 | 4 | 4 | 4 | 4 | — | — |
| Ethylene glycol | — | — | — | — | 4 | 4 | 4 | 4 | 4 | — | — |
| Alumina trihydrate | — | — | — | 66.7 | — | — | — | — | — | 100 | 100 |
| Chopped glass | — | — | — | — | — | 11 | — | — | — | — | — |
| Benzoyl peroxide (55% paste) | 3 | 4 | 4 | 4 | 1.5 | 1.5 | 3 | 2 | 2 | 4 | 4 |
| Cumyl hydroperoxide | — | — | 1 | 1 | 1 | 1 | 1 | 2 | 1 | — | — |
| t-butyl hydroperoxide | 1 | 1 | — | — | — | — | — | — | — | — | — |
| t-butyl perbenzoate | — | — | — | — | — | — | — | — | — | 2.5 | 2.0 |
| Styrene | — | — | — | 23 | — | — | — | — | — | 34 | 45 |
| Component B | | | | | | | | | | | |
| Quaternary ammonium borohydride | 9.9(1) | 6(2) | 3.5(3) | 5.5(3) | 5(3) | 5(3) | 3* | 3* | 3* | 3* | 3* |
| Dimethyl aniline | 0.6 | 0.5 | 0.5 | 0.5 | 0.5 | 0.5 | 0.3 | 0.3 | 0.3 | 0.4 | 0.4 |
| Diethyl aniline | 0.2 | 0.2 | 0.2 | 0.2 | 0.2 | 0.2 | 0.1 | 0.1 | 0.1 | 0.15 | 0.15 |
| Density g/cm³ | 0.13 | 0.23 | 0.24 | 0.62 | 0.26 | 0.27 | 0.29 | 0.27 | 0.29 | 0.77 | 0.96 |
| Compressive strength at 10% kPa deformation | — | 1523 | — | 8991 | 2654 | 2268 | 1551 | — | — | — | — |
| Compressive strength kPa at yield | 751 | — | — | 9653 | — | — | 3992 | 3682 | 2448 | — | — |
| % deformation at yield | 4 | — | — | 20 | — | — | 26 | 6 | 6.5 | — | — |

Parts by weight
(1)Quaternary ammonium borohydride based on Maquat 1412 and Hyamine 3500.
(2)Quaternary ammonium borohydride based on Arquad and Maquat 1416
(3)Quaternary ammonium borohydride based on Alkaquat 451 all prepared by the aqueous method.
*prepared from Alkaquat 451 by the non-aqueous method.

What is claimed is:

1. A liquid or readily liquifiable mixture of at least two different quaternary ammonium borohydrides selected from those falling within the formula:

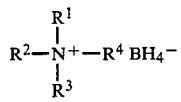

wherein $R^1$, $R^2$ and $R^3$ may be the same or different and each is selected from alkyl, alkenyl, cycloalkyl, aryl, alkaryl and aralkyl groups and $R^4$ is selected from alkyl or alkenyl groups having from 6 to 30 carbon atoms, with the proviso that $R^1$, $R^2$ and $R^3$ and $R^4$ are not all alkyl or that $R^1$, $R^2$, or $R^3$ is not benzyl when the remainder of $R^1$, $R^2$, $R^3$ and $R^4$ are all alkyl, and with the proviso that the borohydrides of said mixture vary only with respect to differences in group $R^4$.

2. A mixture of quaternary ammonium borohydrides which is liquid or readily liquifiable at ambient temperature, said mixture comprising at least two different quaternary ammonium borohydrides selected from those falling within the formula:

prises mixing alkaline aqueous solutions of a borohydride salt, and a mixture of at least two different quaternary ammonium salts corresponding to the desired mixture of quaternary ammonium borohydrides, extracting the resulting quaternary ammonium borohydride mixture with an organic solvent, and evaporating the solvent.

6. A method of preparing a mixture of quaternary ammonium borohydrides which is liquid or readily liquifiable at ambient temperature, said mixture comprising at least two different borohydrides which fall within the formula:

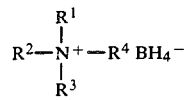

in which $R^1$ and $R^2$ are methyl groups, $R^3$ is a benzyl group and $R^4$ is an alkyl or alkenyl group having 6 to 20 carbon atoms, the borohydrides of said mixture varying only with respect to differences in group $R^4$, which method comprises mixing alkaline aqueous solutions of a borohydride salt, and a mixture of at least two different quaternary ammonium salts corresponding to the desired mixture of quaternary ammonium borohydrides, extracting the resulting quaternary ammonium borohydride mixture with an organic solvent, and evaporating the solvent.

7. A method of preparing a mixture of quaternary ammonium borohydrides which is liquid or readily liquifiable at ambient temperatures, said mixture comprising at least two different borohydrides which fall within the formula:

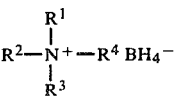

in which $R^1$, $R^2$ and $R^3$ may be the same or different and each is selected from alkyl, alkenyl, cycloalkyl, aryl, alkaryl and aralkyl groups and $R^4$ is selected from alkyl or alkenyl groups having from 6 to 30 carbon atoms, with the proviso that $R^1$, $R^2$, $R^3$ and $R^4$ are not all alkyl or that $R^1$, $R^2$, or $R^3$ is not benzyl when the remainder of $R^1$, $R^2$, $R^3$ and $R^4$ are all alkyl, and with the proviso that the borohydrides of said mixture vary only with respect to differences in group $R^4$, which method comprises adding, as reactants, a finely divided solid borohydride salt to an organic solution of a mixture of at least two different quaternary ammonium salts corresponding to the desired quaternary ammonium borohydride mixture, and permitting the reactants to react to form the quaternary ammonium borohydride mixture in solution and precipitate by-product.

8. A method of preparing a mixture of quaternary ammonium borohydrides which is liquid or readily liquifiable at ambient temperature, said mixture comprising at least two different borohydrides which fall within the formula:

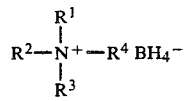

in which $R_1$ and $R_2$ are methyl groups, $R^3$ is a benzyl group and $R^4$ is an alkyl or alkenyl group having 6 to 20 carbon atoms, the borohydrides of said mixture varying only with respect to differences in group $R^4$, which method comprises adding as reactants, a finely divided solid borohydride salt to an organic solution of a mixture of at least two different quaternary ammonium salts corresponding to the desired quaternary ammonium borohydride mixture, and permitting the reactants to react to form the quaternary ammonium borohydride mixture in solution and precipitate by-product.

* * * * *